US007809670B2

(12) United States Patent
Lee et al.

(10) Patent No.: US 7,809,670 B2
(45) Date of Patent: Oct. 5, 2010

(54) CLASSIFICATION OF MALWARE USING CLUSTERING THAT ORDERS EVENTS IN ACCORDANCE WITH THE TIME OF OCCURANCE

(75) Inventors: Tony Lee, San Francisco, CA (US);
Jigar J. Mody, Bellevue, WA (US);
Ying Lena Lin, Sammamish, WA (US);
Adrian M. Marinescu, Sammamish, WA (US); Alexey A. Polyakov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 970 days.

(21) Appl. No.: 11/608,625

(22) Filed: Dec. 8, 2006

(65) Prior Publication Data
US 2007/0136455 A1 Jun. 14, 2007

Related U.S. Application Data

(60) Provisional application No. 60/748,804, filed on Dec. 9, 2005.

(51) Int. Cl.
*G06F 17/00* (2006.01)
(52) U.S. Cl. .......................................... 706/59; 726/22
(58) Field of Classification Search ................... 706/20, 706/59; 380/28; 713/160, 187, 188; 726/13, 726/22–26
See application file for complete search history.

(56) References Cited

U.S. PATENT DOCUMENTS 7,574,409 B2 * 8/2009 Patinkin ...................... 706/12

| 2004/0111708 | A1 * | 6/2004 | Calder et al. ................ 717/131 |
| 2004/0199827 | A1 * | 10/2004 | Muttik et al. ................. 714/38 |
| 2006/0212942 | A1 * | 9/2006 | Barford et al. ................ 726/24 |
| 2006/0282425 | A1 * | 12/2006 | Aggarwal et al. .............. 707/5 |
| 2009/0276383 | A1 * | 11/2009 | Salahshour et al. ........... 706/12 |

OTHER PUBLICATIONS

Wei et al., Profiling and Clustering Internet Hosts, 2006, International Conference on Data Mining, pp. 1-7.*
Yang et al., A Study on Retrospective and On-line Event Detection, 1998, ACM 1-58113-015-5.*
Guan et al., Y-Means: A clustering method for intrusion detection, 2003, CCECE 2003 CCGEI, MOntreal, IEEE.*
Lee, T., and J.J. Mody, "Behavioral Classification," Proceedings of the European Institute for Computer Antivirus Research Conference, Hamburg, Germany, Apr. 29-May 3, 2006, pp. 1-17.

* cited by examiner

*Primary Examiner*—David R Vincent
(74) *Attorney, Agent, or Firm*—Workman Nydegger (57) ABSTRACT

The present invention is directed to a method and system for automatically classifying an application into an application group which is previously classified in a knowledge base. More specifically, a runtime behavior of an application is captured as a series of events which are monitored and recorded during the execution of the application. The series of events are analyzed to find a proper application group which shares common runtime behavior patterns with the application. The knowledge base of application groups is previously constructed based on a large number of sample applications. The construction of the knowledge base is done in such a manner that each sample application can be classified into application groups based on a set of classification rules in the knowledge base. The set of classification rules are applied to a new application in order to classify the new application into one of the application groups.

20 Claims, 6 Drawing Sheets

| | | | | | | | | |
|---|---|---|---|---|---|---|---|---|
| APPLICATION A | FR | RR | RW | FR | | NW(RC) | NW(EML) | FW | MO |
| SEQUENCE | 1 | 2 | 3 | 4 | | 5 | 6 | 7 | 8 |
| APPLICATION B | FR | RR | FR | NW(IRC) | | MO | MO | FW | |

CLASSIFICATION OF MALWARE USING CLUSTERING THAT ORDERS EVENTS IN ACCORDANCE WITH THE TIME OF OCCURANCE

CROSS-REFERENCE TO RELATED APPLICATION

This application claims the benefit of the filing date of U.S. Provisional Application No. 60/748,804, filed Dec. 9, 2005, the subject matter of which is incorporated herein by reference.

BACKGROUND

The constant progress of communication systems that connect computers, particularly the explosion of the Internet and intranet networks, has resulted in the development of a new information era. With a single personal computer, a user may obtain a connection to the Internet and have direct access to a wide range of resources, including electronic business applications that provide a wide range of information and services. Solutions have been developed for rendering and accessing a huge number of resources. However, as more computers have become interconnected through various networks abuse by malicious computer users has also increased. As a result, there are a number of tools or resources that identify potentially malicious software, generally referred to as malware, have been developed to protect computers from the growing abuse that is occurring on modern networks. As described herein, malware includes, but is certainly not limited to, spyware, ad ware, viruses, Trojans, worms, RootKit, any other computer program, or executable software code that performs actions that are malicious or not desirable to the user.

Malwares can be classified into a malware "family" if they correspond to malware variations originating from one source base and exhibit a set of consistent behaviors. Currently, some anti-malware systems are developed to classify a suspicious or unknown application into a known malware family and therefore recognize an effective way to remove threats based on the previous knowledge of the malware family. One approach may be an automatic malware classification which uses one or more selected undesirable events indicative for a malware family to classify a malware application. However, this conventional automatic malware classification approach may provide only limited protection.

Typically, conventional automatic malware classifications use a static analysis focusing on whether one or more selected undesirable activities have been detected. However, this static analysis does not detect a malware variation which has subtle differences in code flow and data but still sharing common behavior patterns with its malware family. Thus, conventional automatic malware classifications may not yet be able to recognize common behavior patterns across malware variants or compilers and data/code variations within a malware family.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a computer implemented method for classifying an application into an application group based on behavior patterns of the application is provided. The method includes collecting an event sequence of an application and determining an application group corresponding to the application based on the collected event sequence. A set of application groups, each of which includes one or more member applications sharing a set of common behavior patterns, is obtained from a knowledge base. The set of common behavior patterns is represented by a representative event sequence. In an aspect of the computer implemented method, in order to determine an application group corresponding to the application, a similarity distance between the application and each application group is calculated by comparing the representative event sequence of each application group and the collected event sequence. After determining the application group for the application, the information about the determined application group is provided. If necessary, the application group is updated to include the application. If no application group is determined to correspond to the application, a determination is made as to whether a new application group needs to be created. Accordingly, a new application group to include the application may be created.

In accordance with another aspect of the present invention, a computer system for an application group classification is provided. The computer system includes one or more databases and a computing device, in communication with the one or more databases. The databases include application groups and a set of application classifying rules where each application group has been classified based on the set of application classifying rules. The computing device receives a request to classify an application into a corresponding application group among the application groups and obtains an event sequence which was collected during the execution of the application. The application group with which the application is associated is determined by applying the set of application classifying rules to the obtained event sequence.

In accordance with yet another aspect of the present invention, an application classification system is provided. The application classification system includes a knowledge base component, an event sequence component, and a classification component. The knowledge base component provides information about a plurality application classification and a set of classification rules. The classification component identifies an application classification in which the application is to be classified based on a runtime event sequence collected by the event sequence component.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, embodiments of the present invention relate to a method and system for automatically classifying an application into an application group which is previously classified in a knowledge base. More specifically, a runtime behavior of an application is captured as a series of "events" which are monitored and recorded during the execution of the application. Each captured "event" represents a token at a particular point in a time sequence during the execution of the application. The series of events are analyzed to find a proper application group, a member application of which shares common runtime behavior patterns with the application. The application groups are previously classified in a knowledge base based on a large number of sample applications.

The following detailed description describes exemplary embodiments of the invention. Although specific system configurations, screen displays, and flow diagrams are illustrated, it should be understood that the examples provided are not exhaustive and do not limit the present invention to the precise forms and embodiments disclosed. It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. However, it will be apparent to one skilled in the art that the invention may be practiced without some or all of these specific details. In other instances, well-known process steps have not been described in detail in order not to obscure the invention.

Figure 1:
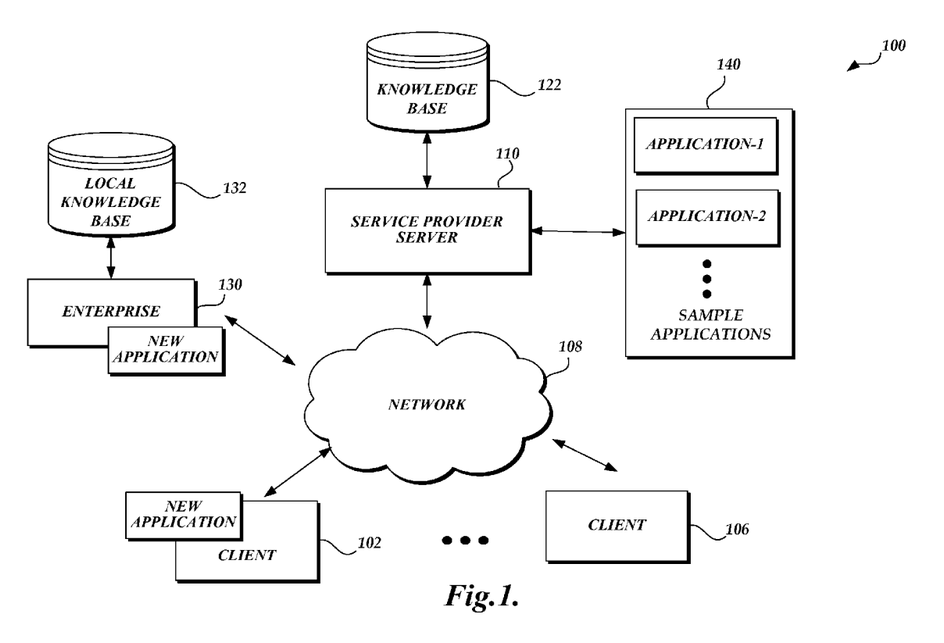
FIG. 1 is a pictorial diagram depicting an exemplary environment that facilitates an application classification via a service provider server in accordance with embodiments of the present invention.

FIG. 1 depicts an illustrative networked environment 100 suitable for classifying an application into an application group based on previously known behavior patterns. The illustrative networked environment 100 of FIG. 1 includes one or more client devices, such as client devices 102-106, to which a service provider server 110 provides online or offline application classification services. The client devices 102-106 communicate with the service provider server 110 via a communication network, such as the Internet 108. The client devices 102-106 are typically computing devices including a variety of configurations or forms such as, but not limited to, laptop or tablet computers, personal computers, personal digital assistants (PDAs), hybrid PDA/mobile phones, mobile phones, workstations, and the like.

In FIG. 1, the service provider server 110 may also include a knowledge base 122. The knowledge base 122 provides data storage of various types of data, information, etc. and may be organized as desired, preferably using data structures optimized for providing a set of application groups and a set of rules to classify a given application into one of the application group. Each application group includes one or more member applications sharing a set of common behavior patterns. For example, the set of application groups may be previously classified based on known malware applications and their runtime behaviors. The process of classifying of the known malware applications into groups may be done by analyzing the known malware applications to extract knowledge of the known malware applications into a hierarchical or structured format. Based on the learned knowledge, a set of classifying rules are determined to recognize familiar patterns and correlate similarities among the known malware applications. In this manner, common behavior patterns across malware variants or compilers and data/code variations within a malware family (group) can be detected.

The knowledge base 122 may be built based on sample applications 140 via any suitable data classifying/minding methods, including, but not limited to, partitioning based on similarities, Bayesian classifiers, decision tree, and/or term vector/inverse index in conjunction with machine learning. In a preferred embodiment, the application groups in the knowledge base 122 may be classified (or trained) through a process of "clustering". A process of "clustering," as used herein, refers to a form of unsupervised learning, for example, a process to organize objects into groups whose members are similar in some way. Generally, a clustering process can be used to discover hidden semantic structure in a collection of unlabeled data. Through the process of clustering, the knowledge base 122 may be built to include a set of application groups based on sample applications 140. Each application group classified through the process of clustering may refer to a collection of applications which shows "similar" behaviors among applications within the application group and shows "dissimilar" behaviors from applications within other application groups. As will be understood by one of ordinary skill in the art, for the process of clustering, a defined distance measure may be utilized to combine applications into an application group (e.g., combine a malware into a malware family or a particular group in a malware family). Generally described, a distance measure may be defined to yield a degree of similarity between two applications. The examples and implementation of the distance measure will be discussed in greater detail below.

The illustrative networked environment 100 also includes an enterprise system 130 coupled to a local knowledge base 132 which includes information about application groups specific to the enterprise system. Within the local knowledge base 132, the application groups may be customized for the enterprise system to control what kind of behaviors are allowed or disallowed on the enterprise system.

For the purpose of discussion, the embodiments and examples described herein are depicted in conjunction with a set of application groups and a clustering process. Once the knowledge base 122 is constructed, the set of classifying rules in conjunction with the set of application groups are applied to the runtime behavior patterns (event information) of a new application in order to classify the new application into a corresponding application group. In some instances, the constructed knowledge base 122 can be used to detect an application group corresponding to a particular application. For example, if the knowledge base is constructed based on known malware samples, the knowledge base can be integrated into an anti-malware application as signatures, utilized to detect a malware family for a given target threat behavior. Target threat behavior information can be obtained as an event sequence, for example, from an emulator built in the anti-malware application that is completely isolated from the host operating system.

Figure 2:
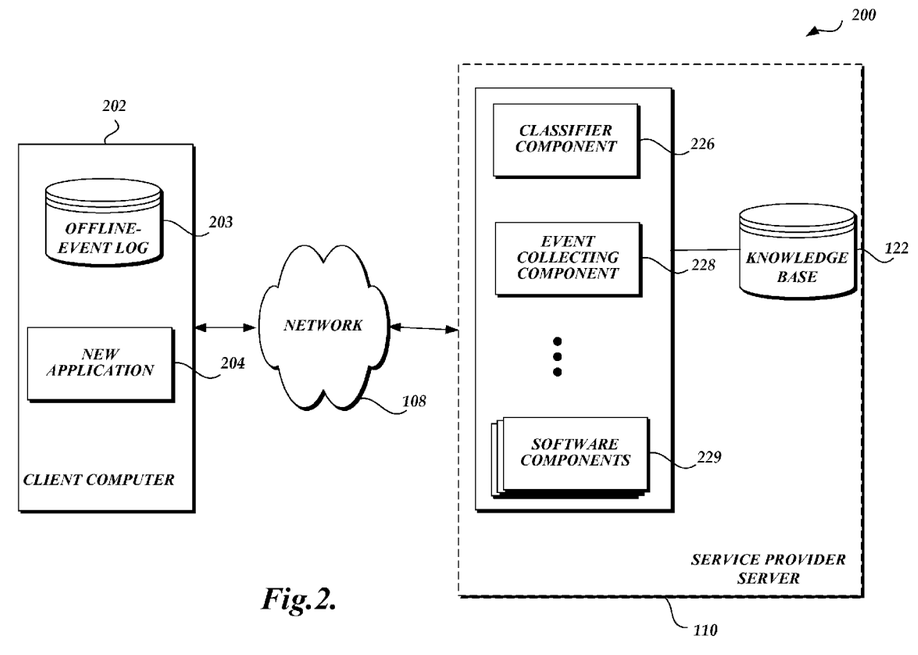
FIG. 2 is a pictorial diagram depicting an exemplary service provider server interacting with a client in accordance with embodiments of the present invention.

Now with reference to FIG. 2, components of the server 110 and the client computer 104 that are capable of implementing aspects of the application classification will be described. For ease of illustration and because it is not important for an understanding of the claimed subject matter, FIG. 2 does not show the typical components of many computers, such as a CPU, keyboard, a mouse, a printer, or other I/O devices, a display, etc. However, as illustrated in FIG. 2, the server 110 does include a classifier component 226, an event collecting component 228 and other software components 229 necessary to provide services. Moreover, the client computer 104 includes an offline event log 204 and a processing component 206.

For the purpose of discussion, assume that the server 110 is communicatively coupled to the knowledge base 122 includes a set of application groups, each of which corresponds to a particular malware family or malware group. Assume further that for classifying an application into an application group, the server 110 considers a sequence of events as runtime behavior patterns of the application. The service provider server 110 may provide online or offline application classification services.

As illustrated in FIG. 2, a new application in the client computer 104 may be evaluated to determine whether the new application is one of the known malware family variants. In one embodiment, each malware application may be represented by its runtime behavior patterns in the form of sequenced events. The service provider server (event collecting component 228) starts collecting a series of events while the new application is being executed (or emulated).

Since functions and different embodiments of the event collecting component 228 are described below in conjunction with a routine 500 in FIG. 5, a detailed description of the component 228 will not be provided here. However, generally described, the event collecting component 228 monitors the client devices, waiting for any triggering event or a service request for classifying a new application into one of the known malware families. The triggering event may include detecting a new application running on the client device, or detecting an attempt to install a new application on the client device, and the like. Alternatively, a client can request a classification service of a new application to the service provider server 110. When the triggering event is detected, a series of events and time information may be collected during the execution of the new application. The series of events and time information can be collected As will be appreciated by one of ordinary skill in the art, the events (e.g., event objects) are basic elements that define actions and state transitions in an event-driven system such as most conventional operating systems (e.g., the Windows Operating System) of the client devices.

In one embodiment, a set of specific events may be predefined to be captured for the clustering process of a particular knowledge base. For example, several events which can exemplify key features of malware may be predefined to be captured for constructing a knowledge base of malware families. The examples of such predefined events includes, but are not limited to, "registry open," "registry write," "registry query," "file open," "file write," "virtual memory allocation," "virtual memory write," "network access," "process open," etc. The collected events are ordered according to the time of the occurrence of program actions and environment state transitions, which results in an event sequence.

Moreover, it is to be understood that each of the events can contain further information on the action represented, including, but not limited to, event object (registry, file, process, socket, etc.), event subject (process that takes the action), action parameters (registry value, file path, IP address, etc), status of the action (e.g., file handle created, registry removed etc.), and the like. As discussed above, when the knowledge base of malware families is constructed, event sequences of the known malware applications are captured and the orders of the captured events are normalized in time sequence. These event sequences are represented in a hierarchical or structured format in the knowledge base, constituting the semantics of the particular malware behavior. As described above, one of the structured formats is a cluster (an application group) formed based on a similarity distance.

After the event sequence of the new application is generated, the classifier component 226 may evaluate the event sequence of the new application based on the knowledge base. In one embodiment, a similarity distance between applications may be utilized for the clustering process when the knowledge base is constructed. In this embodiment, the sample applications (e.g., known malware applications) are initially classified into several application groups, based on a defined distance measure which yields a similarity distance between two applications. Given the defined distance measure, by repeated classification, the applications in each group are closest to each other, and furthest from those in other groups.

The event sequence of the application may be compared with the event information of each application group in the knowledge base in order to calculate similarity distances. For example, each application group has a representative behavior pattern which is represented by a representative event sequence. In this example, the event sequence of the new application and the representative event sequence of each application group may be compared to calculate a similarity distance between the event sequences. The classifier component 226 may determine whether the new application can be classified into an application group with the closest (nearest) similarity distance. In some instances, no group is determined as close enough for the application to be a part of any group. In such instances, the closest similarity distance may not be meaningful to classify the new application. Thus, the service provider server 110 may maintain a threshold value for the acceptable similarity distance among applications to form a group. In some cases, the new application may have previously been classified into an application group. In this case, the classifier component 226 can detect the application group corresponding to the new application and provide that information about the detected application group. Exemplary functions and embodiments of the classifier component 226 are described below in conjunction with a subroutine 600 in FIG. 6.

In some instances, the service provider server 110 may provide an offline classification service. For example, an offline client device 202 collects the events during the execution of a new application 204 and store the event sequence in the offline event log database 203. After the client device is connected to the service provider server 110, the stored event sequences may be transmitted to the service provider server 110 for offline evaluation to classify the new application into a proper application group.

Those skilled in the art and others will recognize that the service provider server 110 and the client computer 202 illustrated in FIG. 2 are highly simplified examples that only illustrate components that are necessary for an understanding of the claimed subject matter. It is to be noted that the service provider server 110 and the client computer 202 will have additional components that are not illustrated in FIG. 2. Thus, FIG. 2 illustrates only one example of computers capable of implementing aspects of the present invention and is not intended to suggest any limitation as to the scope of use or functionality of the claimed subject matter.

Figure 3:
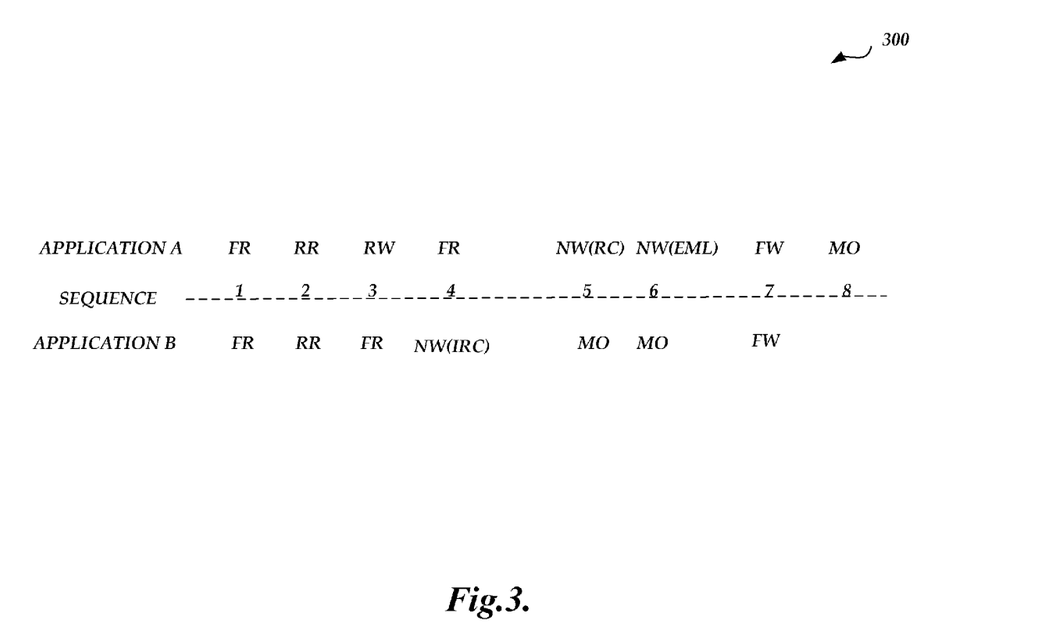
FIG. 3 is exemplary event sequences of two applications that are captured by the exemplary service provider server.

Referring to FIG. 3, the exemplary event sequences that are captured by the service provider server for a clustering process is shown. As with FIG. 2, assume that for classifying an application into an application group, the service provider server 110 considers a sequence of events as a runtime behavior pattern of the application. As shown, application A has an event sequence of File Write (FW), Registry Read (RR), Registry Write (RW), File Read (FR), FR, Network activity (NW), NW, FW, and Mutex Open (MO). Application B has an event sequence of FW, RR, FR, RW, NW, MO, and FW. Based on these event sequences, a similarity distance between application A and application B may be measured to determine whether application A and application B have similar behavior patterns.

For example, edit distance method may be adapted to be suitable for measuring a degree of similarity between event sequences (i.e., a similarity distance between event sequences of applications). In the adapted edit distance method, a similarity distance is defined by the minimum cost required to transform one event sequence to another event sequence by applying a set of operations. Further, the cost of a transformation from one event sequence to another is defined by the cost of applying an ordered set of operations required to complete the transformation. The cost of each operation may be predefined as a rage of values. For example, replacing FW with FR may be defined as "0.4" while the cost of replacing NW with NR may be defined as "1.9." As will be appreciated, the cost and the set of operations may be defined, as appropriate, such a manner in which event sequence similarity can be properly determined for the clustering process. To further refine the similarity measure, the cost of each operation may be adjusted based on a particular event and particular operation. In this manner, the distance measure method can be refined from training data, therefore increasing the accuracy of the application groups.

Figure 4:
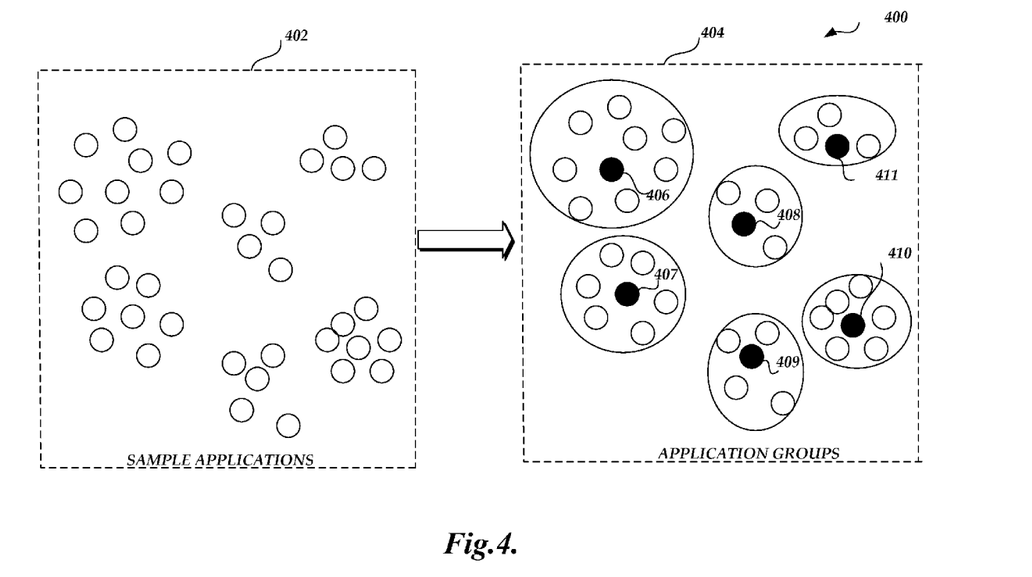
FIG. 4 is a pictorial diagram depicting classification of applications based on a similarity distance between a group and an application in accordance with embodiments of the present invention.

FIG. 4 is a pictorial diagram depicting classification of sample applications based on a similarity distance between an application group and an application in accordance with embodiments of the present invention. As shown, the service provider server 110 may take sample applications 402 (e.g., known malware applications) to build a knowledge base via a clustering process. In order to have an efficient analysis, the knowledge base may store a set of application groups, each of which may have one representative behavior pattern. This representative behavior pattern may be compared with a behavior pattern of the new application for classification. As describe above, the representative behavior pattern may be represented by an event sequence.

In one embodiment, the known sample applications 402 are partitioned into several application groups 404 such that the similarity distance between a "centroid application" 406-411 and other applications within each application group is minimized. A "centroid application," as used herein, refers to an application which is located in a center of an application group. The center of an application group may be considered as an actual data point most closely representing the behavioral semantic of the member applications in the application group. As will be appreciated by one of ordinary skill in the art, utilizing the centroid application (centroid) may reduce the number of comparisons to classify a new application into one of the application groups. For example, if there are six groups with 35 applications, a new application may be compared with six centroids instead 35 applications. This partitioning clustering with a centroid application can be done based on the adapted edit distance measure as described previously. Consequently, an application located in a center of each application group may be selected as a centroid, a representative of their respective application groups.

In an alternative embodiment, the new application may be compared with each application in an application group and an average of the similarity distances between the new application and the applications in the application group may be considered when a similarity distance from the new application is calculated.

Figure 5:
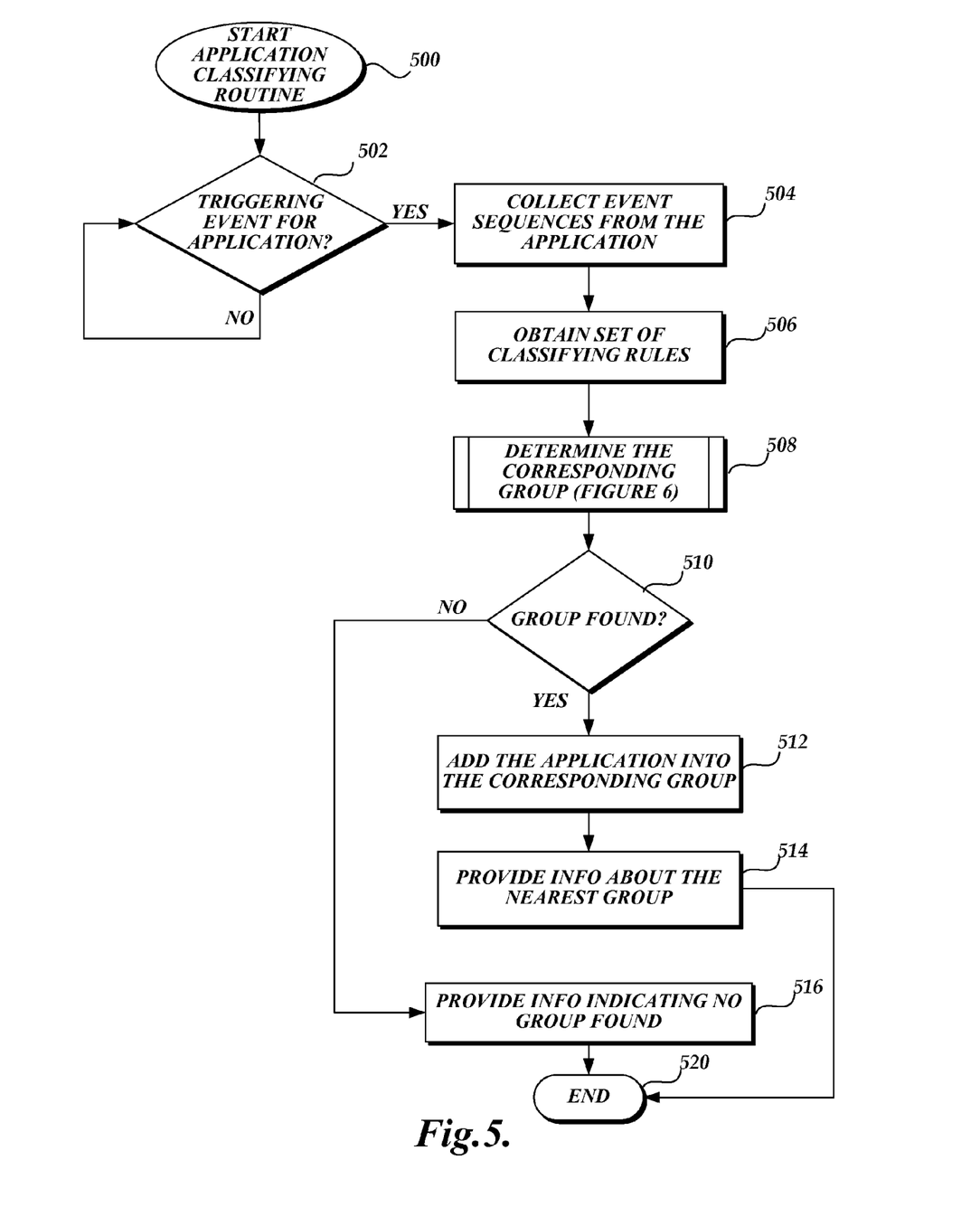
FIG. 5 is a flow diagram depicting an application classifying routine for classifying an application into an appropriate group.

Referring to FIG. 5, a flow diagram depicts an application classifying routine for classifying an application into a corresponding appropriate group in accordance with embodiments of the present invention.

For the purpose of discussion, assume that the knowledge base has information about a set of application groups and a set of classifying rules based on the previous clustering process on the sample applications. Assume further that each application group has a centroid application (centroid) for providing a representative event sequence which reflects a common runtime behavior pattern of the member applications in the application group. Thus, the similarity distance between a new application and an application group may be measured by a similarity distance between the new application and the centroid of the application group.

At decision block 502, a determination is made as to whether a service triggering event for classifying an application is detected. The service provider server 110 may monitor the service triggering event, for example, a new application is detected on a client device. Alternatively, a client device may request a classification service for a new application to the service provider server 110. If there is no service triggering event detected, the routine will return to decision block 502 waiting for a service triggering event. If it is determined that a service triggering event is detected, at block 504, a set of predefined events may be collected during the execution of the new application. Information relevant to the collected events may also be obtained. This information may be utilized to tune a distance measure to more accurately partition groups. Subsequently, the collected events may be normalized in time and converted into an event sequence suitable for a clustering process.

Figure 6:
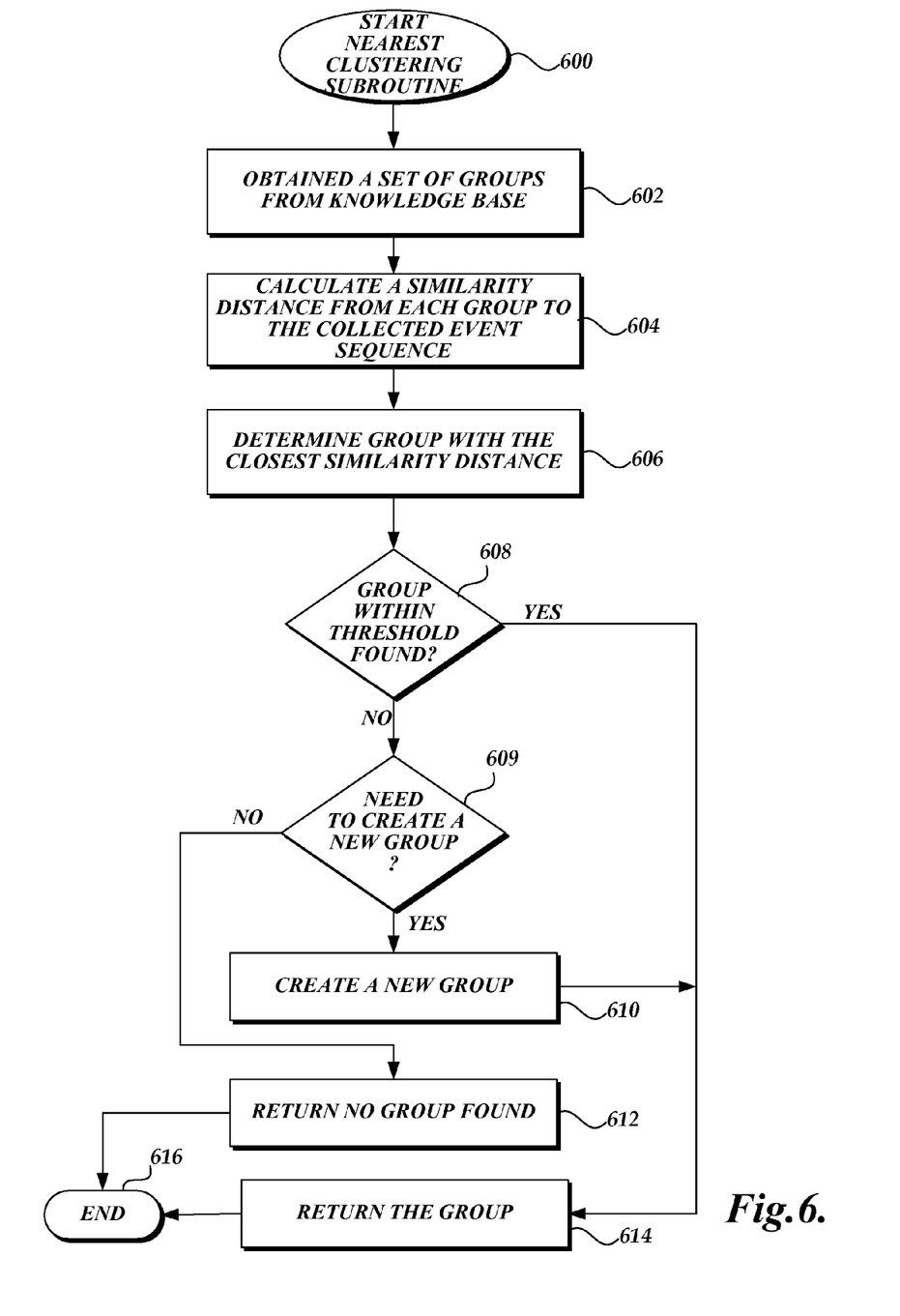
FIG. 6 is a flow diagram depicting a nearest clustering subroutine for calculating a similarity distance between an application and an application group in accordance with embodiments of the present invention.

At block 506, information related to the set of application groups may be obtained. The information may include a set of classification rules governing how to classify, for example a nearest neighbor, centroid, etc., an application into an application group. A desirable distance measure may also be defined in the set of classification rules. At block 508, an application group corresponding to the new application may be determined via a subroutine 600 (FIG. 6). At decision block 510, a determination is made whether the corresponding application group is found. If the corresponding application group is found, at block 512, information about the application may be added into the corresponding application group and the knowledge base may be updated if necessary. In some cases, the newly added application can be located in the center of the application group and thus the newly added application becomes a centroid of the corresponding group. As mentioned above, the set of application groups result from partitioning several application groups in such a manner that the average similarity distance between a centroid and other applications within each application group can be minimized. Thus, in some instances, the application groups may be repartitioned due to changes in centroids, similarity distances among applications, or the like. As will be appreciated by one of ordinary skill in the art, an application group may be divided into other application groups or some application groups may be merged into one application group during the process of repartitioning.

At block 514, the information about the determined application group may be provided. For example, if the new application is classified to determine whether the application is one of the known malware family variants, the information of the malware family where new application belongs may be provided. In one embodiment, such information may be fed into an anti-malware application or anti-malware module residing on the client device. In another embodiment, the information may be presented on the screen of the client device allowing users to perform appropriate actions.

If it is determined at decision block 510 that no corresponding application group is found, the information indicating that no corresponding application group is found may be provided at block 516. For example, the information indicating that no malware family has been identified with respect to the application may be provided to the client device, an anti-malware application, etc. The routine 500 completes at block 520.

Referring to FIG. 6, a flow diagram depicts a nearest clustering subroutine for calculating a similarity distance between an application and application groups in accordance with embodiments of the present invention. As with FIG. 5, assume that the set of classifying rules indicates that the event sequence of the new application is to be classified based on the knowledge base via a clustering process. Assume further that the knowledge base includes a set of application groups which are previously partitioned and classified in accordance with the set of classifying rules.

At block 602, a set of application groups are obtained from the knowledge base. At block 604, for each application group, a similarity distance from the new application may be calculated. In a particular embodiment, a similarity distance may be measured by a distance measure, for example the adapted edit distance measure, which is suitable to compare two event sequences for a degree of similarity. The similarity distance may be measured by the cost of transforming a reprehensive event sequence of each application group into the event sequence of the new application. As will be understood by one of ordinary skill in the art, any other suitable distance measure method can be used to calculate the similarity between the application and the application group. At block 606, an application group with the closest similarity distance from the new application may be determined.

At decision block 608, a determination is made whether the application group with the closest similarity distance is in fact close enough to the application so that the application can be combined with the application group. In one embodiment, this may be determined by a threshold value for a closest similarity distance. In order to partition the application group with more resembled applications, a threshold value for the similarity distance may be defined. If the similarity distance from an application group is greater than the threshold value, the application is considered to be outside of the application group. Thus, the application can not be a member of an application group even if the application group has the closest similarity distance from the application.

If it is determined that the application group with the closest similarity distance and the new application can not be combined, at decision block 609 a determination is made as to whether a new application group is to be created for the new application. This may be determined based on the set of classification rules. If it is determined that a new application group is to be created, at block 610 a new application group having the new application as a centroid may be created. If it is determined that a new application group is not to be created, the information indicating that no group was found, the application may be returned at block 612. In some instances, the set of application groups may be repartitioned in order to classify the new application. For example, if more than one application groups are determined to have the closest similarity distance with the new application, the application groups may be reorganized so that only one application group has the closest similarity distance from the application. If it is determined that an application group where the application is classified is found or after creating a new application group for the application, the application group may be returned. The routine 600 completes at block 616.

Although the aforementioned examples and embodiments are described in conjunction with a particular clustering process with a centroid, it is to be understood that any suitable clustering, data mining or classification process can be utilized to build a particular knowledge base. In one embodiment, in order to improve the accuracy of the classification, the service provider server 110 may receive feedback from human analysts periodically and reflect the feedback to the knowledge base. For example, for a knowledge base for malware families, anti-malware analysts may evaluate the reprehensive runtime behavior patterns of a particular malware family and provide feedback. The knowledge base may be updated accordingly.

It is contemplated that the classification information with a set of runtime behavior patterns (e.g., a set of groups with a reprehensive event sequence) may be integrated into other applications. For example, if the knowledge base is constructed based on known malware samples, the centers of malware groups (e.g., a set of event sequences of centroids) can be integrated into an anti-malware application as signatures, utilized to classify unseen malwares, by calculating distance between target threat behavior against that of the group center point (based on empirical threshold value). Target threat behavior information can be obtained as an event sequence, for example, from an emulator built in the anti-malware application that is completely isolated from the host operating system.

It is also contemplated that the behavioral classification can happen either real-time on a user machine (Real-Time Protection) as well as offline, where the event sequence can be collected based on suspicious behavior and signatures can be created offline (traditional signature based scanning).

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer system for an application group classification, the computer system comprising:
one or more databases for including a plurality of application groups and a set of application classifying rules, wherein each application group has been classified based on the set of application classifying rules and includes one or more member applications sharing a set of common behavior patterns according to an event sequence, wherein each event includes information about the event's action including event object information, event subject information, action parameters and status of the action; and
a computing device, in communication with the one or more databases, that performs the following:
receives a request to classify an application into a corresponding application group among the plurality of application groups;
obtains an event sequence according to a predefined specific set of events that identify two or more specified malware features, the predefined events including at least one of "registry open," "registry write," "registry query," "file open," "file write," "virtual memory allocation," "virtual memory write," "network access," and "process open," wherein the event sequence is collected while the application is being executed, and wherein the collected events are ordered according to the time of the occurrence of program actions and environment state transitions;

determines the corresponding application group for the application by applying the set of application classifying rules to the obtained event sequence; and provides information about the determined application group as a response to the request.

2. The computer system of claim 1, wherein sample applications are classified into the plurality of application groups through a clustering process.

3. The computer system of claim 1, wherein the computing device adds the application into the determined application group as a member application.

4. The computer system of claim 1, wherein the set of application classifying rules calculate and compare a degree of similarity between the application and each application group to determine the application group for the application.

5. The computer system of claim 1, wherein each member of the corresponding application group has an event sequence similar to the obtained event sequence.

6. The computer system of claim 5, wherein the degree of similarity is measured via an event edit cost analysis.

7. A computer implemented method for classifying an application into an application group based on behavior patterns of the application, the computer implemented method comprising:

collecting an event sequence of an application;

obtaining a set of application groups, wherein each application group includes one or more member applications sharing a set of common behavior patterns according to an event sequence, wherein each event includes information about the event's action including event object information, event subject information, action parameters and status of the action;

determining an application group corresponding to the application based on the collected event sequence, wherein the event sequence is obtained according to a predefined specific set of events that identify two or more specified malware features, the predefined events including at least one of "registry open," "registry write," "registry query," "file open," "file write," "virtual memory allocation," "virtual memory write," "network access," and "process open," wherein the event sequence is collected while the application is being executed, and wherein the collected events are ordered according to the time of the occurrence of program actions and environment state transitions; and updating the determined application group to include the application; and providing information about the determined application group.

8. The computer implemented method of claim 7, wherein the set of common behavior patterns is represented by a representative event sequence.

9. The computer implemented method of claim 8, wherein determining an application group corresponding to the application includes calculating a similarity distance between the application and each application group; and wherein the similarity distance is calculated by comparing the representative event sequence of each application group and the collected event sequence.

10. The computer implemented method of claim 9, further comprising:

identifying an application group which has a closest similarity distance from the application, wherein the identified application group is selected to be the application group corresponding to the application.

11. The computer implemented method of claim 10, further comprising:

if no application group is determined to correspond to the application, determining whether a new application group needs to be created; and if a new application group needs to be created, creating the new application group to include the application.

12. The computer implemented method of claim 10, wherein when the similarity distances between the application and the set of application groups exceed a threshold, no application group is determined to correspond to the application.

13. The computer implemented method of claim 11, further comprising:

if a new group needs not to be created, providing information indicating that no application group is determined for the application.

14. The computer implemented method of claim 10, further comprising:

if more than one application groups are determined to have the closest similarity distance, reorganizing the set of application groups so that only one application group has the closest similarity distance from the application.

15. The computer implemented method of claim 12, wherein the similarity distance is calculated via a distance measure which defines a similarity distance among event sequences.

16. An application classification system for automatically classifying an application in response to a classification request, the application classification system comprising:

a knowledge base component for providing information about a plurality of application classifications and a set of classification rules;

an event sequence component for collecting an runtime event sequence of an application in response to a classification request, wherein each event includes information about the event's action including event object information, event subject information, action parameters and status of the action, and wherein the event sequence is obtained according to a predefined specific set of events that identify two or more specified malware features, the predefined events including at least one of "registry open," "registry write," "registry query," "file open," "file write," "virtual memory allocation," "virtual memory write," "network access," and "process open," wherein the event sequence is collected while the application is being executed, and wherein the collected events are ordered according to the time of the occurrence of program actions and environment state transitions; and a classification component for identifying an application classification in which the application is to be classified based on the collected runtime event sequence and for adding the application to the identified application classification, wherein the identified application classification has a reprehensive event sequence similar to the collected runtime event sequence; and wherein the information about the determined application group includes an indication that the application is a variant of a known malware application.

17. The application classification system of claim 16, wherein the set of classification rules are defined for an enterprise system.

18. The application classification system of claim 17, wherein the knowledge base component builds a local knowledge base representing the information about a plurality of new application classifications based on the set of classification rules.

19. The application classification system of claim 18, wherein the local knowledge base is utilized to determine the application has runtime behaviors which are allowed within the enterprise system.

20. The application classification system of claim 16, wherein the identified application classification is provided as a response to the classification request.

* * * * *